(12) United States Patent
Suutarinen

(10) Patent No.: US 7,088,996 B1
(45) Date of Patent: Aug. 8, 2006

(54) TRACING IN MOBILE COMMUNICATIONS SYSTEM

(75) Inventor: Jari Suutarinen, Tampere (FI)

(73) Assignee: Nokia Corporation, Espoo (FI)

( * ) Notice: Subject to any disclaimer, the term of this patent is extended or adjusted under 35 U.S.C. 154(b) by 220 days.

(21) Appl. No.: 09/721,363

(22) Filed: Nov. 22, 2000

Related U.S. Application Data

(63) Continuation of application No. PCT/FI99/00495, filed on Jun. 8, 1999.

(30) Foreign Application Priority Data

Jun. 8, 1998 (FI) ..................... 981302

(51) Int. Cl.
   *H04Q 7/20* (2006.01)
(52) U.S. Cl. .................. 455/423; 455/67.11; 455/415; 455/414.1
(58) Field of Classification Search ............... 455/410, 455/435, 411, 552, 422, 436, 526, 558, 456, 455/426, 415, 418, 456.1, 423, 424, 422.1, 455/426.1, 412.1, 435.1, 414.1, 434, 552.1, 455/67.11, 425, 456.5; 379/246, 247
See application file for complete search history.

(56) References Cited

U.S. PATENT DOCUMENTS

| | | | | |
|---|---|---|---|---|
| 4,531,023 A | * | 7/1985 | Levine | 379/93.02 |
| 5,031,204 A | * | 7/1991 | McKernan | 455/560 |
| 5,694,451 A | * | 12/1997 | Arinell | 379/32.04 |
| 5,727,057 A | * | 3/1998 | Emery et al. | 455/406 |
| 5,819,177 A | * | 10/1998 | Vucetic et al. | 455/425 |
| 5,873,040 A | * | 2/1999 | Dunn et al. | 455/456.2 |
| 5,889,474 A | * | 3/1999 | LaDue | 455/456.1 |
| 5,930,344 A | * | 7/1999 | Relyea et al. | 379/126 |
| 5,974,309 A | * | 10/1999 | Foti | 455/412.1 |
| 5,978,669 A | * | 11/1999 | Sanmugam | 455/410 |
| 5,987,325 A | * | 11/1999 | Tayloe | 455/435 |
| 5,999,616 A | * | 12/1999 | Fellner et al. | 379/247 |
| 6,009,321 A | * | 12/1999 | Wang et al. | 455/410 |
| 6,088,588 A | * | 7/2000 | Osborne | 455/418 |
| 6,119,000 A | * | 9/2000 | Stephenson et al. | 455/432 |

(Continued)

FOREIGN PATENT DOCUMENTS

EP 0673176 9/1995

(Continued)

OTHER PUBLICATIONS

M. Mouley and M. Pautet; :The GSM System for Mobile Communications, Palaiseau, France, 1992, ISBN:2-9507190-0-7.

(Continued)

*Primary Examiner*—Edward F. Urban
*Assistant Examiner*—John J. Lee
(74) *Attorney, Agent, or Firm*—Squire, Sanders & Dempsey L.L.P.

(57) ABSTRACT

A tracing facility is used for tracing the activities of various entities in the network when specific events occur within the system. The problem with prior art tracing is that activation as well as deactivation of this facility is done manually at the switching center by the operator. Therefore, it is loading network management and making the use of tracing facility difficult. The invention relates to a method of trace activation in a mobile communication system. It is characteristic for the method that a mobile station (MS) directs a communication to a predefined trace activation number and tracing is activated for the communicating mobile station (MS).

12 Claims, 3 Drawing Sheets

U.S. PATENT DOCUMENTS

| | | | | |
|---|---|---|---|---|
| 6,134,593 | A * | 10/2000 | Alexander | 709/229 |
| 6,137,870 | A * | 10/2000 | Scherer | 379/127 |
| 6,137,876 | A * | 10/2000 | Wong et al. | 379/246 |
| 6,163,701 | A * | 12/2000 | Saleh et al. | 455/456 |
| 6,181,940 | B1 * | 1/2001 | Rune | 455/435 |
| 6,320,955 | B1 * | 11/2001 | Bushnell et al. | 379/246 |
| 6,603,966 | B1 * | 8/2003 | Sheffield | 455/423 |

FOREIGN PATENT DOCUMENTS

WO     WO 97/49257     12/1997

OTHER PUBLICATIONS

International Search Report for PCT/FI99/00495.

\* cited by examiner

TRACING IN MOBILE COMMUNICATIONS SYSTEM

This application is a continuation of international application serial number PCT/FI99/00495, filed 8 Jun. 1999.

FIELD OF THE INVENTION

The invention relates to a tracing facility in a mobile communications network, where tracing is activated and deactivated for individual mobile terminals.

BACKGROUND OF THE INVENTION

FIG. 1 of the attached drawing shows a simplified block diagram of the GSM mobile communications system. The mobile station MS is connected via a radio path to a base transceiver station BTS, in FIG. 1 to the base station BTS1. A base station sub-system BSS consists of a base station controller BSC and the base stations BTS controlled by it. A mobile services switching center MSC usually controls several BSC and is connected to other mobile services switching centers and a GMSC (Gateway Mobile Services Switching Center). Via the GMSC, the GSM network is connected to other networks, such as the PSTN (Public Service Telephone Network), another mobile communication network (PLMN), or the ISDN network. The operation of the entire GSM system is monitored by the operation and maintenance center OMC. Subscriber data is stored in the Home Location Register HLR and in the Visitor Location Register VLR.

In a data communications system, network and mobile terminal functionality can be observed by tracing. A tracing facility enables the network to trace the activities of various entities when specific events occur within the system. The tracing facility enables the tracing of all the information that is available to the network concerning the call path. Examples of information that could be in a trace record are the identity of the originating and terminating equipment of the subscriber, supplementary services invoked, and all A-interface messages. The tracing facility can be used during system testing and commissioning, for example. In particular it may be used in conjunction with test mobile stations to confirm the network integrity and also the network quality of service (QoS). The facility may be used for subscriber observation, e.g. following a customer complaint or when the operator suspects malfunction of equipment, or at the request of the police. An example of equipment malfunction is the failure of handovers. Furthermore, tracing makes it possible for the network to define a particular subscriber's location with the accuracy of a base station, for example.

Tracing can be divided into subscriber tracing, i.e. the tracing of the International Mobile Subscriber Identity IMSI, and equipment tracing, i.e. the tracing of the International Mobile station Equipment Identity IMEI. IMEI may be traced in order to find out the current IMSI, or the location or behavior of faulty or stolen equipment when reported via the EIR (Equipment Identity Register).

Trace activation is performed at the initiative of an operator by the switching center MSC to allow a trace record to be produced for a particular IMSI or IMEI when an invocation event occurs. Tracing is invoked by sending a BSSMAP MSC_INVOKE_TRACE message from the MSC to the BSS. The invocation event could be a location update, a call set-up, a handover, and/or a SMS (Short Message Service), for example. Trace records are generated according to the trace type given at trace activation. The trace type describes the invoking events for which the operator wishes to collect a trace record for a particular IMSI or IMEI and the type of record to be collected, i.e. the information needed. When a subscriber undertakes such action as to cause an invoking event to start, the compilation of a trace record commences according to the trace type. The trace is deactivated by the operator at the MSC using a special management function. Deactivation also occurs when the subscriber leaves the network service area or when a certain time limit is met. Network elements can limit the number of simultaneous traces by either rejecting a trace request or by only producing a sub-set of the information required.

The problem with the above described tracing facility according to prior art is that activation as well as deactivation of the tracing is done manually at the switching center MSC by the operator. This causes extra load for network management thus making the use of the tracing facility difficult. Furthermore, the activated trace is on until it is deactivated and might be recording unnecessarily when deactivation has not occurred in due time. For example, test mobile stations of the maintenance personnel are usually traced continuously although this would be desirable for only part of the time. This useless tracing causes excessive load to the MSC and the OMC and unduly restricts the number of terminals that can be traced. Yet another problem with the prior art tracing facility is that the numbers to be traced have to be set manually in advance and due to the load caused to the network by tracing, the number of these numbers set to be traced is usually limited.

SUMMARY OF THE INVENTION

The object of this invention is to provide an easily manageable tracing facility, especially simple trace activation.

This is achieved by using a method according to the invention characterized by what is stated in the independent claim 1. Special embodiments of the invention are presented in the dependent claims.

The invention is based on the idea that trace activation is executed when the mobile terminal contacts a predefined number. In a first embodiment of the invention, tracing is activated when the mobile terminal calls the predefined number and deactivated when this call ends. Tracing is thus active during the call and automatically deactivated at the end of the call. In a second embodiment of the invention, tracing is activated when the mobile terminal sends a message to the predefined number. In the second embodiment, tracing is deactivated when the mobile terminal sends another message to the predefined number or when a preset time period has elapsed, for example. There can be simultaneously many such predefined numbers, each of which executes trace activation for the mobile terminal that contacts the number. For example, these numbers can be predefined for different purposes, such as for maintenance personnel, commissioning personnel, customer service personnel, and customers. Also a call forwarded to one of these numbers triggers trace activation execution.

The advantage of the method according to the invention is that it provides simple trace activation and thus increases the usability of the tracing facility. Furthermore, the tracing facility according to the invention is simpler to manage.

Another advantage of the method according to the invention is that the operation of the switching center is optimized and automatized as far as the tracing facility is concerned. Especially tracing during the commissioning of a new base station site is facilitated.

Yet another advantage of the method according to the invention is that it can serve a greater number of subscribers overall, although only a few at one time. When only the traces needed and wanted are saved, the storing of useless records is avoided in the network.

BRIEF DESCRIPTION OF THE DRAWINGS

The preferred embodiments of the invention will now be described with reference to the attached drawings, in which.

DETAILED DESCRIPTION OF THE INVENTION

Figure 1:
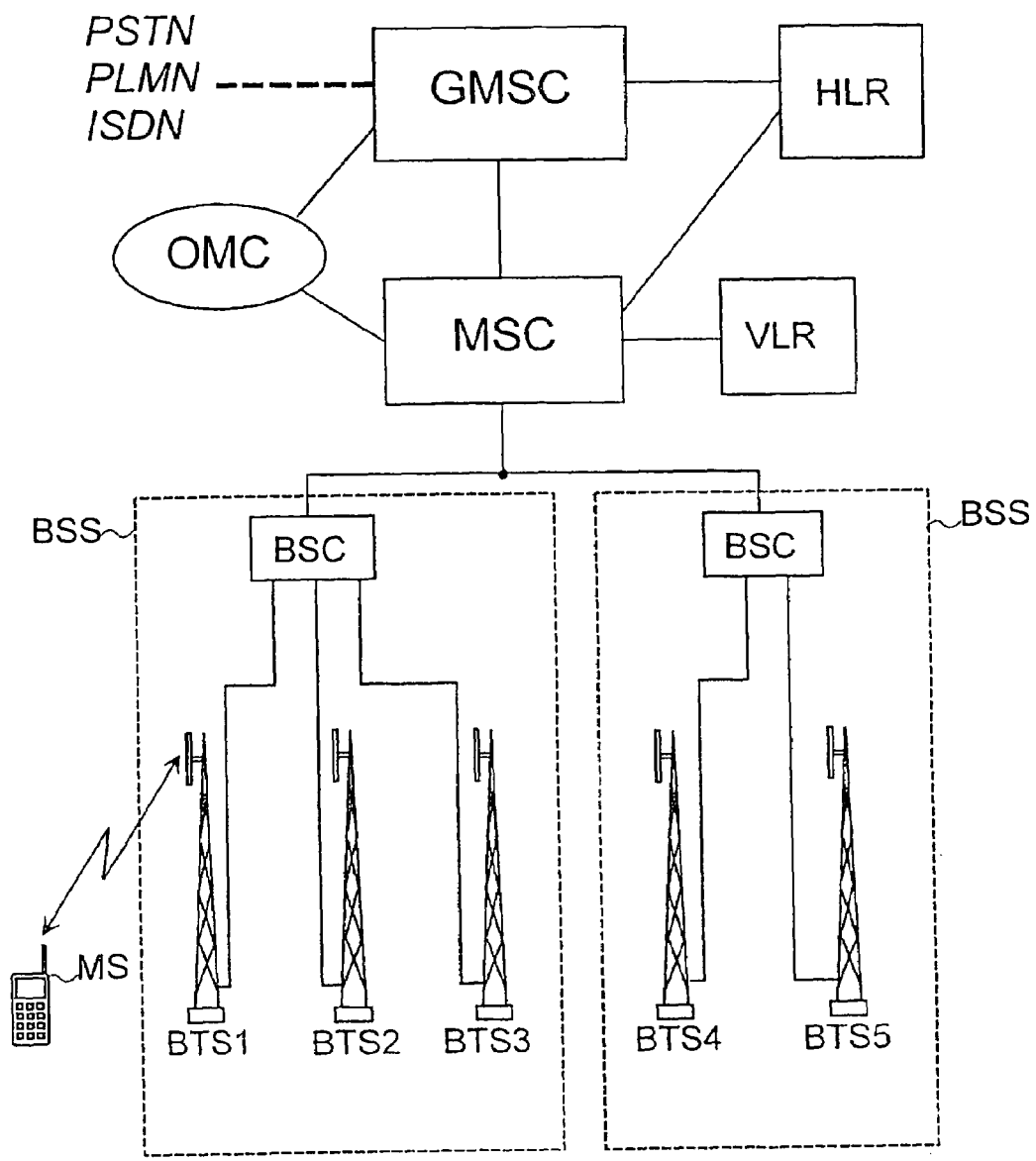
FIG. 1 shows the parts of the mobile communication network that are essential for the invention.

The present invention can be applied to any radio network. The invention will be described below in more detail, mostly by using the digital mobile communications system GSM as an example. FIG. 1 shows the simplified structure of a GSM network as described earlier. The GSM system is described in GSM specifications and the book: "The GSM System for Mobile Communications", M. Mouly & M. Pautet, Palaiseau, France, 1992, ISBN:2-9507190-0-7, where an interested reader can find more background information.

In the following, the first embodiment of the invention is described in more detail with reference to FIGS. 2 and 3.

Figure 2:
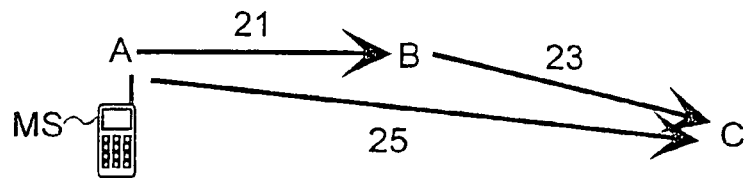
FIG. 2 shows the trace activation according to the invention.

FIG. 2 shows the trace activation procedure according to the invention. In the first embodiment of the example presented in the figure, mobile station MS (party A) calls party B (stage 21). If the phone number of party B is defined to be a number activating tracing facility according to the invention, i.e. defined as a trace activation number, the tracing facility is activated when a call is made to this number at stage 21. Tracing is invoked according to prior art when an invocation event occurs. If the phone number of party C is defined as a trace activation number, the tracing is activated when the call is forwarded by party B to this number at stage 23. An example of such a situation would be when a customer service (party B) forwards the call that party A made to the trace activation number of party C. This functionality is of use in cases when a subscriber reports poor network quality or field strength, for example. By forwarding the call to a trace activation number, the customer service is able to trace the location of party A and other information needed to analyze the reported problem. Customer services may also instruct party A to call the trace activation number directly, such as the number of party C. In this case the trace activation would take place when party A calls this given number (stage 25). According to the invention the tracing remains activated during the call and is deactivated when the parties concerned terminate the call.

Figure 3:
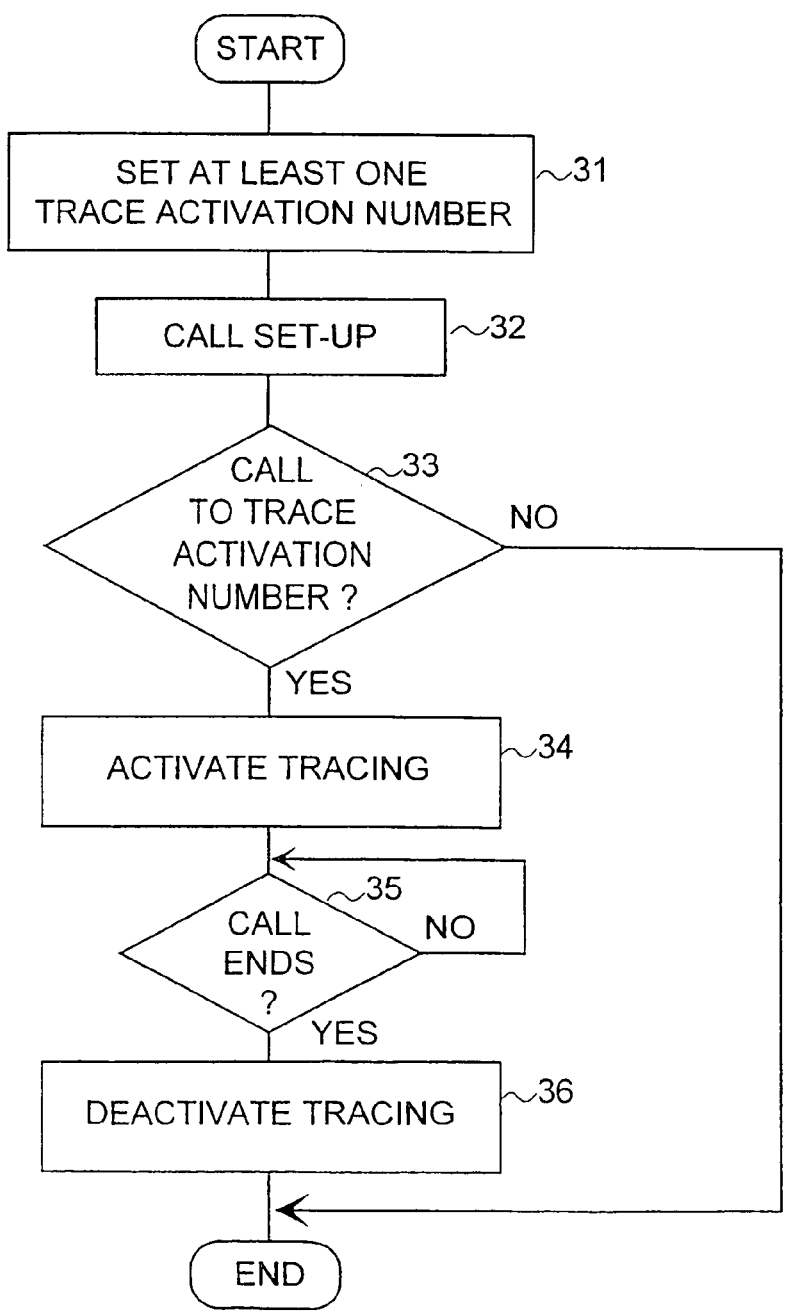
FIG. 3 shows the first embodiment of the method according to the invention as a flow chart.

FIG. 3 shows the first embodiment of the method according to the invention as a flow chart. At step 31 trace activation numbers according to the invention are defined, i.e. the numbers that activate the tracing are set. At step 32 a subscriber starts a call with a call setup. It is checked at step 33, if the call is made to one of the trace activation numbers defined earlier at step 31. When the switching center MSC detects a call made to a trace activation number, it activates the tracing according to the invention (step 34). The tracing is activated for the calling mobile station based on the IMSI or IMEI transferred to the network at call setup. At step 35 the continuance of the call is monitored. Trace records are produced during the call whenever an invoking event occurs. At the end of the call, the switching center MSC deactivates the tracing for this particular mobile station (step 36).

In the second embodiment of the invention, the trace activation is executed by sending a short message from the mobile station. In the example of FIG. 2, mobile station MS (party A) sends a short message to party B (stage 21). If the number of party B is defined to be a trace activation number, the tracing facility is activated when a short message is directed to this number at stage 21. Tracing is invoked according to prior art when an invocation event occurs. According to the invention the tracing remains activated, for example, for a predefined time period or until party B receives another short message from the mobile station MS in question.

Figure 4:
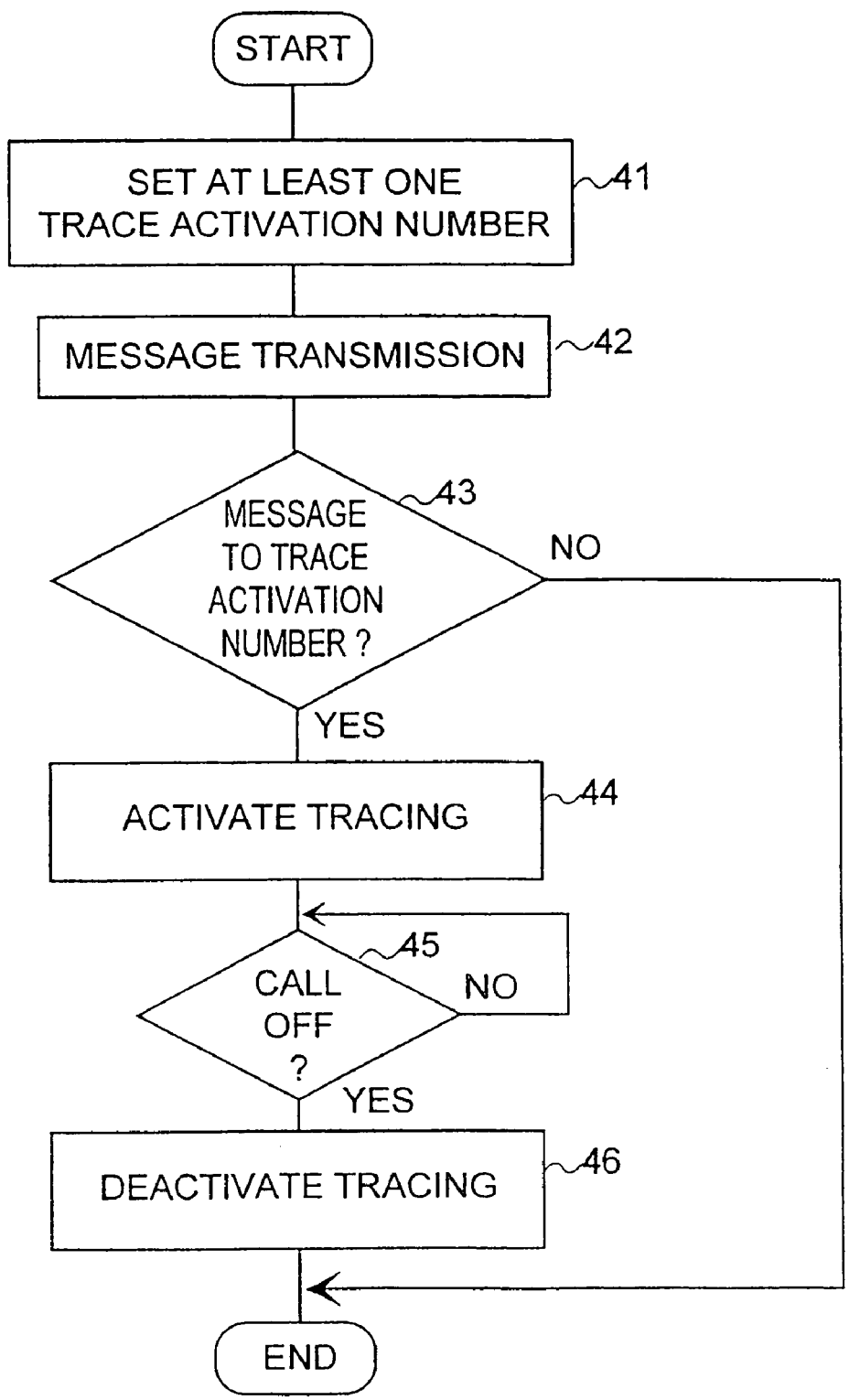
FIG. 4 shows the second embodiment of the method according to the invention as a flow chart.

FIG. 4 shows the second embodiment of the invention as a flow chart. At step 41 trace activation numbers according to the invention are defined, i.e. the numbers that activate the tracing are set. At step 42 a subscriber sends a message, such as short message SMS in the GSM. It is checked at step 43, if the message is send for one of the trace activation numbers defined earlier at step 41. When the switching center MSC detects a message sent to a trace activation number, it activates the tracing according to the invention (step 44). The tracing is activated for the communicating mobile station based on the IMSI or IMEI transferred to the network with the message. At step 45 a stop signal, i.e. a call off of the tracing, such as another message from the mobile station in question or predefined time period elapsing, is monitored. Trace records are produced during the trace activated period whenever an invoking event occurs. When detecting a call off of the tracing, the switching center MSC deactivates the tracing for this particular mobile station (step 46).

The first and second embodiments of the invention described above can also be combined wherein the predefined trace activation numbers activate tracing whenever receiving a communication from a mobile station.

Any communication from a mobile station to a predefined trace activation number activates tracing according to the invention. For example, any call made or forwarded to the trace activation number and/or any short message sent to this number activate tracing for the party A of the communication. In case of a call forwarded to a predefined trace activation number, it is a condition for the method according to the invention that an identifier of the caller (party A), such as IMSI or IMEI, is provided to the trace activation number. Tracing can be subscriber (IMSI) tracing or equipment (IMEI) tracing as in prior art. The trace type can be defined according to the called number or the calling party, for example. The trace type can also be defined to produce records of a pre-selected standard type.

Different trace activation numbers can be defined for different uses. For example, one trace activation number could be defined for commissioning new sites. When a new site is put into use, field personnel could make a few calls to this number so that the trace records produced can be used to check the behavior of the new site.

The trace activation according to the invention is fully automatic after the setting of at least one trace activation number by the operator, for example. Therefore, this kind of trace activation and deactivation is easy to use. Furthermore, trace activation on a call basis does not load the network unnecessarily.

The drawings and the related description are only intended to demonstrate the principles of the invention. The details of the method according to the invention can vary within the patent claims. In this application, a communication from a mobile station means any kind of mobile originating communication, a call or a short message, for example.

The invention claimed is:

1. A method of trace activation in a mobile communications system, wherein a mobile station is in communication with a mobile communications network, the method comprising the steps of:

defining a predefined trace activation number;

directing a communication from the mobile station to said predefined trace activation number of a tracing facility for activating tracing for the mobile station, wherein the tracing facility includes a receiver of the communication;

activating tracing at the tracing facility for the mobile station from which the communication originates;

tracing mobile communications system activities relating to the mobile station from which the communication originates when a trace activation event occurs; and generating a trace report for the mobile station.

2. The method according to claim 1, wherein the directed communication is a call from the mobile station and tracing is activated for the calling mobile station, and the method further comprises the step of:

deactivating tracing when the call is ended.

3. The method according to claim 1, wherein the directed communication is a message from the mobile station.

4. The method according to claim 3, wherein the method further comprises a step of:

deactivating tracing when a preset time period is elapsed.

5. The method according to claim 3, wherein the method further comprises a step of:

deactivating tracing when a second message from the mobile station is directed to the predefined trace activation number.

6. The method according to claim 1, wherein the method further comprises a step of:

defining at least one said trace activation number.

7. The method according to claim 1, wherein the communication is directed to the predefined trace activation number directly from the mobile station.

8. The method according to claim 1, wherein the communication is forwarded to the predefined trace activation number.

9. The method according to claim 1, wherein tracing is activated and deactivated automatically at the switching center.

10. The method according to claim 1, wherein subscriber tracing is activated for the mobile station.

11. The method according to claim 1, wherein equipment tracing is activated for the mobile station.

12. A system for trace activation, wherein a mobile station is in communication with a mobile communications network, the system comprising:

a tracing facility having a predefined trace activation number and configured to trace mobile communications network activities relating to a mobile station, when a trace activation event occurs;

directing means for directing a communication from a mobile station to the predefined trace activation number of the tracing facility for activating tracing of mobile communications network activities relating to the mobile station;

activating means for activating tracing at the tracing facility for the mobile station from which the communication originates; and generating means for generating a trace report for the mobile station, wherein the tracing facility includes a receiver of the communication.

* * * * *